US012167725B2

(12) United States Patent
Romanova et al.

(10) Patent No.: US 12,167,725 B2
(45) Date of Patent: Dec. 17, 2024

(54) MOSQUITO MONITORING AND COUNTING SYSTEM

(71) Applicants: Anastasiia Romanivna Romanova, Kherson (UA); Roman Anatolievich Romanov, Kyiv (UA)

(72) Inventors: Anastasiia Romanivna Romanova, Kherson (UA); Roman Anatolievich Romanov, Kyiv (UA)

( * ) Notice: Subject to any disclaimer, the term of this patent is extended or adjusted under 35 U.S.C. 154(b) by 218 days.

(21) Appl. No.: 17/613,935

(22) PCT Filed: May 18, 2020

(86) PCT No.: PCT/IB2020/054690
§ 371 (c)(1),
(2) Date: Nov. 23, 2021

(87) PCT Pub. No.: WO2020/240335
PCT Pub. Date: Dec. 3, 2020

(65) Prior Publication Data
US 2022/0217962 A1    Jul. 14, 2022

(30) Foreign Application Priority Data

May 24, 2019  (UA) ............... a 2019 05652

(51) Int. Cl.
*A01M 1/02* (2006.01)
*A01M 1/06* (2006.01)
*A01M 1/10* (2006.01)

(52) U.S. Cl.
CPC ............ *A01M 1/026* (2013.01); *A01M 1/023* (2013.01); *A01M 1/06* (2013.01); *A01M 1/106* (2013.01)

(58) Field of Classification Search
CPC ........ A01M 1/026; A01M 1/02; A01M 1/023; A01M 1/04; A01M 1/06; A01M 1/10; A01M 1/106
(Continued)

(56) References Cited

U.S. PATENT DOCUMENTS 138,797 A * 5/1873 Ernst et al. ........... A01M 1/106
                                                            43/118
726,604 A * 4/1903 Williamson .......... A01M 1/106
                                                            43/118
(Continued)

FOREIGN PATENT DOCUMENTS

EP   2149301 A1 * 2/2010 ............ A01M 1/026
GB   2570138 A  * 7/2019 ............ A01M 1/023
(Continued)

*Primary Examiner* — Darren W Ark
(74) *Attorney, Agent, or Firm* — Lloyd & Mousilli; Benjamin M. Hanrahan

(57) ABSTRACT

A mosquito monitoring and counting system, including a sensor, the sensor including a high-speed computer vision camera, a detector, an antenna, a central processing unit, a counting sensor, and a GSM or WIFI module. The high-speed computer vision camera is installed in a trap diffuser, the counting sensor detects all insects that enter an air stream, and the central processing unit, based on artificial intelligence through neural networks, is adapted to process a data array, count and classify insects into species and subspecies, transmit the processed data array via the GSM or WIFI module over the Internet to a server, and further processing the data array and submitting a result to be graphically integrated with a mapping service.

9 Claims, 1 Drawing Sheet

(58) Field of Classification Search
USPC .............. 43/107, 139, 113; 340/573.2, 573.1
See application file for complete search history.

(56) References Cited

U.S. PATENT DOCUMENTS

| | | | | |
|---|---|---|---|---|
| 1,505,651 A * | 8/1924 | Loeschen | ............... | A01M 1/04 |
| | | | | 43/107 |
| 1,693,368 A * | 11/1928 | Cherry | ................... | A01M 1/08 |
| | | | | 55/510 |
| 2,013,969 A * | 9/1935 | Menasche | ............... | A01M 1/08 |
| | | | | 43/139 |
| 2,236,698 A * | 4/1941 | Rector | ................... | A01M 1/04 |
| | | | | 43/139 |
| 3,305,965 A * | 2/1967 | Cornell, III | ............. | A01M 1/08 |
| | | | | 43/139 |
| 3,835,577 A * | 9/1974 | Soulos | ................... | A01M 1/04 |
| | | | | 43/112 |
| 4,248,005 A * | 2/1981 | Hedstrom | ............. | A01M 1/223 |
| | | | | 315/219 |
| 5,020,270 A * | 6/1991 | Lo | .......................... | A01M 1/08 |
| | | | | 43/112 |
| 5,205,064 A * | 4/1993 | Nolen | ................... | A01M 1/023 |
| | | | | 43/112 |
| 5,205,065 A * | 4/1993 | Wilson | ................... | A01N 25/20 |
| | | | | 43/107 |
| 5,327,675 A * | 7/1994 | Butler | .................... | A01M 1/14 |
| | | | | 43/107 |
| 5,329,725 A * | 7/1994 | Bible | ...................... | A01M 1/08 |
| | | | | 43/139 |
| 5,417,009 A * | 5/1995 | Butler | ................... | A01N 43/16 |
| | | | | 43/113 |
| 5,799,436 A * | 9/1998 | Nolen | ................... | A01M 1/223 |
| | | | | 43/112 |
| 6,195,932 B1 * | 3/2001 | Aicher | .................. | A01M 1/04 |
| | | | | 43/112 |
| 6,604,317 B1 * | 8/2003 | Newman | ................. | A01M 1/02 |
| | | | | 43/107 |
| 6,653,971 B1 * | 11/2003 | Guice | ................... | A01M 1/026 |
| | | | | 342/28 |
| 6,688,035 B1 * | 2/2004 | Shichman | ............... | A01M 1/04 |
| | | | | 43/107 |
| 6,817,139 B1 * | 11/2004 | Powell | ................... | A01M 1/08 |
| | | | | 43/139 |
| 6,898,896 B1 * | 5/2005 | McBride | ............... | A01M 1/08 |
| | | | | 43/107 |
| 7,024,815 B1 * | 4/2006 | Visagie | ................. | A01M 1/02 |
| | | | | 43/107 |
| 7,071,829 B2 * | 7/2006 | Gardner, Jr. | ......... | A01M 31/002 |
| | | | | 250/221 |
| 7,656,300 B2 * | 2/2010 | Ronnau | ............... | H04M 11/002 |
| | | | | 340/567 |
| 7,779,575 B2 * | 8/2010 | Hirafuji | ................. | A01M 1/026 |
| | | | | 43/112 |
| 7,980,200 B2 * | 7/2011 | Troutman | ............ | A01K 13/002 |
| | | | | 119/6.5 |
| 8,319,649 B1 * | 11/2012 | Devane | ................. | A01M 1/026 |
| | | | | 340/552 |
| 8,365,995 B2 * | 2/2013 | Jiang | ...................... | G06M 11/00 |
| | | | | 43/107 |
| 8,810,411 B2 * | 8/2014 | Marka | ................... | A01M 29/10 |
| | | | | 340/573.2 |
| 8,896,451 B2 * | 11/2014 | Oppenheimer | ......... | A01M 1/12 |
| | | | | 340/573.2 |
| 9,335,413 B2 | 5/2016 | Weber-Grabau | ..... | A01K 11/006 |
| 9,915,732 B2 | 3/2018 | Weber-Grabau | ....... | G01S 17/04 |
| 10,026,165 B1 | 7/2018 | Fryshman | ............. | G06V 20/17 |
| 10,043,263 B1 | 8/2018 | Fryshman | ............. | A01M 7/00 |
| 10,178,856 B2 | 1/2019 | Mafra-Neto | ........... | G01V 8/20 |
| 10,178,857 B2 | 1/2019 | Massaro | ............ | A01M 1/103 |
| 10,524,461 B1 | 1/2020 | Files | ...................... | G01S 13/888 |
| 10,585,192 B2 | 3/2020 | Weber-Grabau | ......... | G01V 8/20 |
| 11,490,609 B2 * | 11/2022 | Cherukumalli | .......... | A01M 1/06 |
| 12,004,500 B1 * | 6/2024 | Liotta | ................... | A01M 1/12 |
| 2003/0061757 A1 * | 4/2003 | Askin | .................. | A01M 1/023 |
| | | | | 43/112 |
| 2007/0169401 A1 * | 7/2007 | Chyun | .................. | A01M 1/145 |
| | | | | 43/107 |
| 2009/0223116 A1 * | 9/2009 | Meghji | ................. | A01M 1/026 |
| | | | | 43/118 |
| 2010/0186284 A1 * | 7/2010 | Hyde | .................... | A01M 1/226 |
| | | | | 43/132.1 |
| 2014/0226860 A1 * | 8/2014 | Hyde | ..................... | G06V 20/64 |
| | | | | 382/103 |
| 2014/0311014 A1 * | 10/2014 | Feugier | .................. | A01M 1/00 |
| | | | | 43/107 |
| 2015/0216158 A1 * | 8/2015 | Mizrach | ............... | A01M 1/026 |
| | | | | 43/107 |
| 2015/0234049 A1 * | 8/2015 | Weber-Grabau | ......................... |  |
| | | | | H01J 37/32935 |
| | | | | 356/432 |
| 2016/0245916 A1 * | 8/2016 | Weber-Grabau | ......................... |  |
| | | | | H01J 37/32917 |
| 2017/0112116 A1 * | 4/2017 | Ji | ........................... | B65G 49/02 |
| 2017/0223943 A1 * | 8/2017 | Park | ..................... | A01M 1/026 |
| 2017/0231210 A1 * | 8/2017 | Lillamand | ............. | A01M 1/023 |
| | | | | 43/107 |
| 2017/0258068 A1 * | 9/2017 | Eom | ..................... | A01M 1/106 |
| 2017/0273291 A1 * | 9/2017 | Yoo | ..................... | G06V 40/10 |
| 2018/0206472 A1 * | 7/2018 | Maxik | .................... | A01M 1/06 |
| 2018/0206473 A1 * | 7/2018 | Massaro | ............... | A01M 29/12 |
| 2018/0279598 A1 * | 10/2018 | Hur | ........................ | A01M 1/106 |
| 2018/0317473 A1 * | 11/2018 | Gries | ................... | A01M 1/106 |
| 2019/0000059 A1 * | 1/2019 | Marka | ................... | A01M 31/002 |
| 2019/0034736 A1 * | 1/2019 | Bisberg | .................. | G06V 20/66 |
| 2019/0110458 A1 * | 4/2019 | Liu | ....................... | A01M 1/026 |
| 2019/0121302 A1 * | 4/2019 | Reid | .................. | G05B 13/0275 |
| 2019/0133106 A1 * | 5/2019 | Eom | ....................... | A01M 1/08 |
| 2019/0159440 A1 * | 5/2019 | Zheng | ................... | A01M 1/223 |
| 2019/0302265 A1 * | 10/2019 | Jansson | ................ | G01S 17/46 |
| 2020/0000079 A1 * | 1/2020 | Liu | ......................... | A01M 1/04 |
| 2020/0154685 A1 * | 5/2020 | Lepek | ................. | A01K 67/033 |
| 2020/0170234 A1 * | 6/2020 | Dlamini | ................ | G16H 40/67 |
| 2020/0178511 A1 * | 6/2020 | Tang | .................... | G06V 20/52 |
| 2020/0229420 A1 * | 7/2020 | Ben Hamozeg | ....... | G01G 19/42 |
| 2020/0245604 A1 * | 8/2020 | Cherukumalli | ........ | A01M 1/106 |
| 2020/0367483 A1 * | 11/2020 | Geier | ................. | G01N 21/6428 |
| 2020/0396975 A1 * | 12/2020 | Furuta | ................... | A01M 1/223 |
| 2020/0404897 A1 * | 12/2020 | Lillamand | ............. | A01M 1/106 |
| 2021/0029984 A1 * | 2/2021 | Fryers | ................... | H04N 7/188 |
| 2021/0035473 A1 * | 2/2021 | Al-Dilaimi | ............. | A01N 25/00 |
| 2021/0045377 A1 * | 2/2021 | Qin | ...................... | A01M 1/023 |
| 2021/0153492 A1 * | 5/2021 | Chang | ................... | A01M 1/04 |
| 2021/0153493 A1 * | 5/2021 | Zhang | ................... | A01M 1/08 |
| 2021/0209352 A1 * | 7/2021 | Fryshman | ............. | A01M 3/005 |
| 2021/0219535 A1 * | 7/2021 | Romanova | ............ | A01M 1/023 |
| 2021/0251209 A1 * | 8/2021 | Benedek | ................. | A01M 1/06 |
| 2021/0329902 A1 * | 10/2021 | Acharya | ............... | A01M 1/106 |
| 2021/0360204 A1 * | 11/2021 | Wollenhaupt | .......... | G06V 20/52 |
| 2022/0101015 A1 * | 3/2022 | Goodwin | .............. | G06V 40/103 |
| 2022/0104474 A1 * | 4/2022 | Chellappan | ............ | G06V 20/00 |
| 2022/0142135 A1 * | 5/2022 | Acharya | ................. | A01M 1/10 |
| 2022/0361471 A1 * | 11/2022 | Patch | ..................... | H04N 7/188 |
| 2023/0064414 A1 * | 3/2023 | Lepek | ..................... | G06T 7/70 |
| 2023/0106933 A1 * | 4/2023 | Rydhmer | ............. | G06V 10/762 |
| | | | | 348/159 |
| 2023/0129551 A1 * | 4/2023 | Khir | ...................... | A01M 1/026 |
| | | | | 43/132.1 |
| 2023/0189780 A1 * | 6/2023 | Barlow | ................ | A01M 31/002 |
| | | | | 43/114 |
| 2023/0210101 A1 * | 7/2023 | Nguyen | ................ | G06Q 50/02 |
| | | | | 43/132.1 |
| 2023/0210102 A1 * | 7/2023 | Gan | ..................... | A01M 1/023 |
| | | | | 43/113 |
| 2024/0020965 A1 * | 1/2024 | Johns | .................. | G06V 20/00 |

(56) References Cited

U.S. PATENT DOCUMENTS

| | | | |
|---|---|---|---|
| 2024/0044757 A1* | 2/2024 | Scavo | A01M 1/02 |
| 2024/0090489 A1* | 3/2024 | Gromicko | A01M 1/24 |

FOREIGN PATENT DOCUMENTS

| | | | | |
|---|---|---|---|---|
| JP | 2007100353 A | * | 4/2007 | |
| JP | 2021040604 A | * | 3/2021 | |
| KR | 101476256 B1 | * | 12/2014 | |
| KR | 101507554 B1 | * | 4/2015 | |
| KR | 20160058643 A | * | 5/2016 | |
| KR | 101642711 B1 | * | 7/2016 | |
| KR | 101642715 B1 | * | 7/2016 | |
| KR | 101642712 B1 | * | 8/2016 | |
| KR | 20170046426 A | * | 5/2017 | |
| KR | 20170046430 A | * | 5/2017 | |
| KR | 102519804 B1 | * | 4/2023 | |
| WO | WO-2016064735 A1 | * | 4/2016 | G06F 17/00 |
| WO | WO-2017120189 A1 | * | 7/2017 | A01M 1/026 |
| WO | WO-2018101697 A1 | * | 6/2018 | A01M 1/02 |
| WO | WO-2018140679 A1 | * | 8/2018 | A01M 1/00 |
| WO | WO-2019020694 A1 | * | 1/2019 | A01K 11/00 |
| WO | WO-2019079248 A1 | * | 4/2019 | A01M 1/026 |
| WO | WO-2019081375 A1 | * | 5/2019 | A01M 1/026 |
| WO | WO-2020027761 A1 | * | 2/2020 | A01M 1/02 |
| WO | WO-2021001955 A1 | * | 1/2021 | |
| WO | WO-2021001957 A1 | * | 1/2021 | |
| WO | WO-2021029062 A1 | * | 2/2021 | |

* cited by examiner

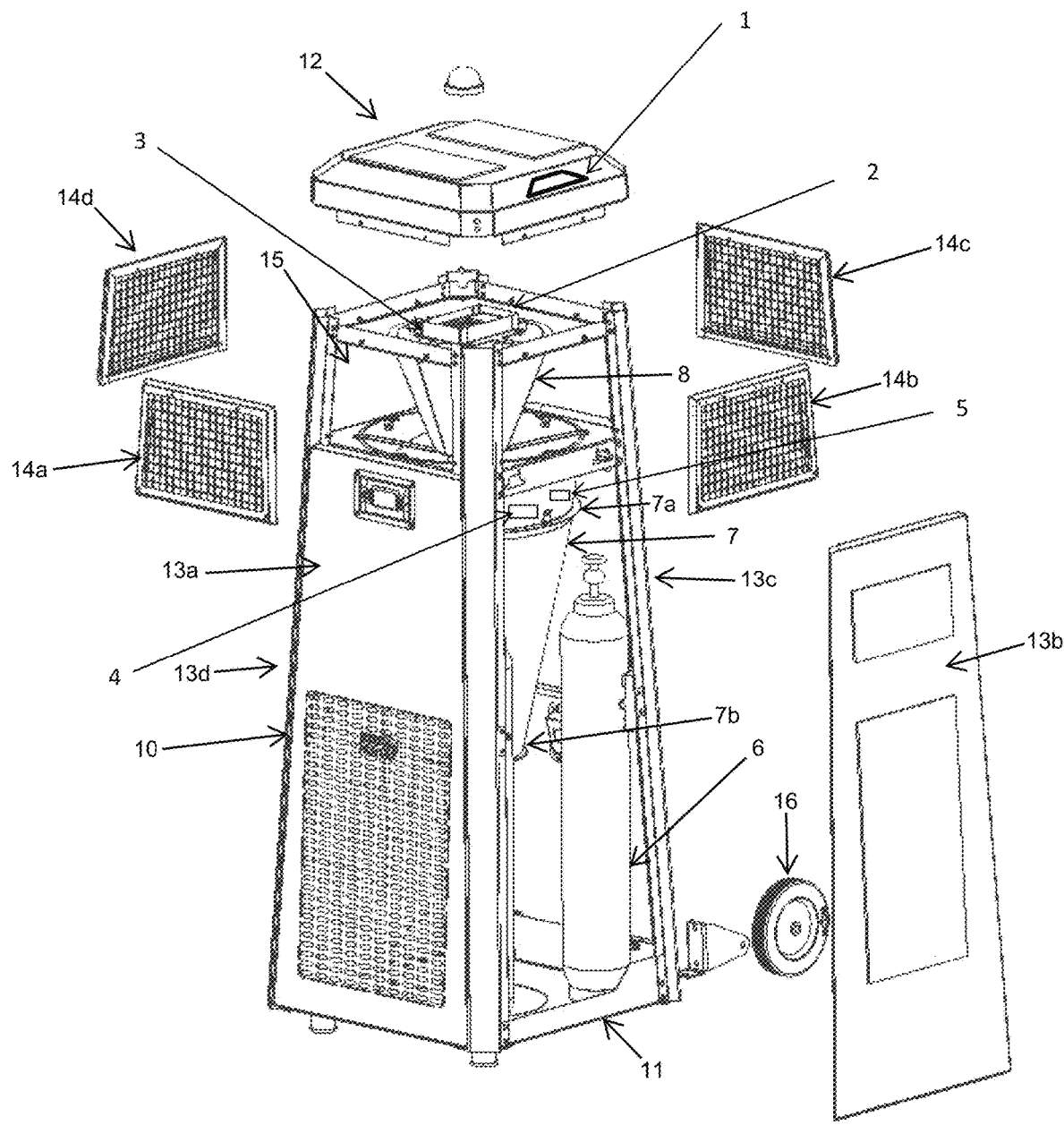

MOSQUITO MONITORING AND COUNTING SYSTEM

CROSS-REFERENCE TO RELATED APPLICATIONS

This application claims priority under 35 U.S.C. Section 371 to the International Application No. PCT/IB2020/054690, filed May 18, 2020, and to the Ukranian Application No. UA/A201905652, filed May 24, 2019, now pending, the contents of which are hereby incorporated by reference.

TECHNICAL FIELD

The present disclosure relates generally to a system and method for remote monitoring and counting of mosquito population in different areas, and the ability to share the data with other users using a relevant application.

BACKGROUND

Traditionally, a wireless sounding system determines mosquito breeding populations and mosquito breeding behavior in a particular region using a server and intelligent simulation software that collects environmental parameters via a wireless sensor (along with other environmental and historical data). This software uses the principle of reproduction prediction to create a prognostic model of reproduction and determine population and behavior (See, for example, Patent No. WO 2016/064735 dated 28 Apr. 2016).

In another example, a system counts and/or monitors insect populations. Insects of at least one defined species are lured and temporarily kept within a certain space. With the help of sensors, sensed data is analyzed based on the distinctive characteristics (See, for example, patent No. WO 2019/020694 A1 dated 31 Jan. 2019).

The disadvantages of the existing devices are the lack of a system for controlling and monitoring mosquitoes, capability of using the application remotely and sharing the obtained information with other users.

SUMMARY

The object of the disclosed embodiments is to improve the features of the device for controlling and monitoring the insects' population in order to create an ecosystem of connected devices, that enables to monitor the mosquitoes density in different regions of the world.

The task is solved by mosquito monitoring and counting system that includes a sensor, the sensor including a high-speed computer vision camera, a detector, an antenna, a central processing unit, and a GSM or WIFI module. The high-speed computer vision camera is installed in a trap diffusor, the counting sensor detects all insects that enter an air stream, and the central processing unit, based on artificial intelligence through neural networks, is adapted to process a data array, count and classify insects into species and subspecies, transmit the processed data array via the GSM or WIFI module over the Internet to a server, and further processing the data array and submitting a result to be graphically integrated with a mapping service. The data processed data array that includes the number of mosquitoes anywhere in the world where mosquito traps are installed are stored in a cloud storage for access by users of an application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 shows a perspective view of the system.

DETAILED DESCRIPTION

The disclosed embodiments remotely monitor and collect data on the number of mosquitoes anywhere in the world where mosquito control systems designed to reduce insect populations and count number of caught insects and/or of other manufacturers are installed. Mosquito monitoring and counting system enables to: share with other users information about the number of mosquitoes; decrease or increase of their population in a particular area; plan tourists' travelling to a given region; monitor in real time where and in which area it is safe to rest without threat to be infected with such diseases as malaria, Zika virus, dengue fever and other mosquito-borne diseases.

The task is solved by a mosquito monitoring and counting system that includes a sensor and a detector, differed by additionally having an antenna, a central processing unit, a counting sensor, a GSM or WIFI module and a sensor made as a high-speed computer vision camera.

The disclosed embodiments are illustrated by a mosquito monitoring and counting system corresponding to FIG. 1. In the embodiment, a mosquito monitoring and counting system includes an antenna 1, a central processing unit 2, a GSM WIFI module 3, a high-speed computer vision camera 4 and a counting sensor 5. The mosquito monitoring and counting system also includes a housing 10 with a bottom base 11, top cap 12 and at least four sides 13a, 13b, 13c, 13d, collectively defining an interior portion 15. The top cap 12 is coaxial with and longitudinally opposite from the bottom base 11. Each of the sides 13a-d include a panel 14a, 14b, 14c, 14d disposed proximate to and beneath the top cap 12. Each of the panels 14a-d include a plurality of mesh openings through which insects travel into the interior portion 15. Furthermore, at least one wheel 16 is attached to and extending from the housing 10. Also within the housing 10 is a trap diffuser 7 defining a top end 7a and a bottom end 7b, the top end 7a being wider than and longitudinal opposite the bottom end 7b, and forming a conical shape.

The device works as follows: the high-speed computer vision camera 4 for mosquito counting is placed in the trap's diffuser 7. Through the counting sensor 5 that records all insects entering the air flow, and the central processing unit 2 that incorporates artificial intelligence using neural networks to process the data, the camera 4 counts and classifies insects into species and subspecies. Then, accumulated data is transmitted via GSM or Wi-Fi over the Internet to the server, where the data is processed and graphically integrated with Google Maps®, other mapping services superimposed on a Google Map, or other search and information services that become available to any registered user for further study. Users can be citizens and government agencies, institutes, schools, R&D centers, laboratories, municipalities. That is, the system enables remote access to control and collect data on the number of mosquitoes anywhere in the world where mosquito traps called SEMCS, designed to reduce insect populations and count number of caught insects and/or of other manufactures are installed.

That is, the system collects information on the number of mosquitoes caught and sends it to the cloud storage, where any user of the application through the Internet resource can see the graph of mosquitoes' activity, increase or decrease in population. In other words, the innovative system catches and counts the trapped insects, and transfers the results to the cloud server.

By connecting via Internet and downloading the application to a computer, tablet or smartphone, the user can control the mosquito trap. For example, the user may change settings, fan 8 intensity, on and off time, set the time of day and night mode, or change the interval at which the fan 8 switches on and the CO2 supply 6.

With the enclosed embodiment, the user can monitor the pattern of activity, dynamics, the number of mosquitoes caught at different times of the day and weather conditions in different regions, using their own mosquito control devices. Also, the user can select on the map the region where these and other mosquito control devices are installed to see dynamics of population decrease or increase, depending on the time of year and weather conditions. Additionally, specialists in mosquito control and the military can collect and process data obtained from different territories for research and control. Also, with the help of a web application one may instantly get information about the activity of mosquitoes in a particular region, along with data on wind speed, ambient temperature, humidity, pressure, rainfall.

Thus, the disclosed embodiment allows for achieving control and regulation of the mosquito population to ensure safe human life.

The invention claimed is:

1. A mosquito monitoring and counting system, comprising:
    a housing comprising a frame, a bottom base attached to the frame, a top cap attached to the frame, at least four panels, and at least four sides extending between said top cap and said bottom base, each of said at least four sides being attached to the frame by being set within a respective first opening of a first set of first openings defined by said frame;
    said top cap, bottom base, at least four panels, and at least four sides define an interior portion;
    each of said at least four panels of said housing disposed proximate to and beneath said top cap and above said at least four sides, each of said panels being attached to the frame by being set within a respective second opening of a second set of second openings defined by the frame, each of said panels providing a plurality of mesh openings through which insects travel into said interior portion;
    a high-speed computer vision camera installed in a trap diffuser within said interior portion of said housing, said trap diffuser comprising a top end and a bottom end, the top end being wider than and longitudinally opposite from the bottom end;
    a fan installed within said interior portion and configured to regulate an air stream through said trap diffuser;
    an antenna attached to said housing;
    a counting sensor installed within said interior portion and configured to detect insects that enter the air stream of the trap diffuser;
    a GSM or WIFI module installed within said interior portion; and
    a central processing unit installed within said interior portion, based on artificial intelligence through neural networks, is configured to:
        process a data array generated by the counting sensor and the high-speed computer vision camera,
        count and classify insects into species and subspecies based on processing the data array,
        transmit the processed data array comprising the count and the classification of the species and the subspecies of the insects via the GSM or WIFI module using the antenna to a server, and
        graphically integrate the processed data array with a mapping service, wherein the processed data array graphically integrated with the mapping service is stored in a cloud storage for access by the users of an application.

2. The mosquito monitoring and counting system of claim 1, further comprising a $CO_2$ supplier configured to provide $CO_2$ to the trap diffuser.

3. The mosquito monitoring and counting system of claim 2 wherein the $CO_2$ supplier is regulated.

4. The mosquito monitoring and counting system of claim 1, wherein the trap diffuser is further configured to catch the insects that enter the air stream of the trap diffuser.

5. The mosquito monitoring and counting system of claim 1, wherein the application stores and outputs historical data relating to the number of insects at a location where the mosquito monitoring and counting system is installed.

6. The mosquito monitoring and counting system of claim 5, wherein the application provides the count of the species and the subspecies of the insects at the mosquito monitoring and counting system and a plurality of other installed mosquito monitoring and counting systems.

7. The mosquito monitoring and counting system of claim 1 wherein the top cap is coaxial with, and longitudinally opposite from the bottom base.

8. The mosquito monitoring and counting system of claim 7 wherein the trap diffuser comprises a conical shape.

9. The mosquito monitoring and counting system of claim 8 further comprising at least one wheel attached to and extending from the housing.

* * * * *